US005666543A

United States Patent [19]
Gartland

[11] Patent Number: 5,666,543
[45] Date of Patent: Sep. 9, 1997

[54] METHOD OF TRAPPING GRAPHICAL OBJECTS IN A DESKTOP PUBLISHING PROGRAM

[75] Inventor: Richard A. Gartland, Bothell, Wash.

[73] Assignee: Adobe Systems Incorporated, Mountain View, Calif.

[21] Appl. No.: 216,729

[22] Filed: Mar. 23, 1994

[51] Int. Cl.⁶ .................................................. G06T 1/00
[52] U.S. Cl. ........................... 395/788; 395/116; 345/431
[58] Field of Search ........................ 395/145–148, 395/131, 133–135, 116–117, 109, 779, 780, 782, 783, 784, 785, 787, 788–790; 345/115, 136, 149–150, 185–191

[56] References Cited

U.S. PATENT DOCUMENTS

| | | | |
|---|---|---|---|
| 4,115,816 | 9/1978 | Moe et al. | 358/459 |
| 4,583,116 | 4/1986 | Hennig et al. | 358/515 |
| 4,603,431 | 7/1986 | Grover et al. | 382/56 |
| 4,683,492 | 7/1987 | Sugiura et al. | 358/518 |
| 4,815,009 | 3/1989 | Blatin | 395/129 |
| 4,817,187 | 3/1989 | Lien | 382/56 |
| 4,821,336 | 4/1989 | Roye | 382/56 |
| 4,824,761 | 4/1989 | Sturgis et al. | 430/209 |
| 4,852,485 | 8/1989 | Brunner | 101/211 |
| 4,916,484 | 4/1990 | Ohlig | 355/91 |
| 4,931,861 | 6/1990 | Taniguchi | 358/528 |
| 5,029,115 | 7/1991 | Geraci | 395/131 |
| 5,043,711 | 8/1991 | Harrington | 345/133 |
| 5,113,249 | 5/1992 | Yosefi | 358/515 |
| 5,115,402 | 5/1992 | Matsushiro et al. | 395/141 |
| 5,131,058 | 7/1992 | Ting et al. | 382/47 |
| 5,157,783 | 10/1992 | Anderson et al. | 395/600 |
| 5,208,905 | 5/1993 | Takakura et al. | 395/148 |
| 5,251,298 | 10/1993 | Nally | 395/166 |
| 5,274,758 | 12/1993 | Beitel et al. | 395/154 |
| 5,295,236 | 3/1994 | Bjorge | 395/134 |
| 5,313,570 | 5/1994 | Dermer et al. | 395/131 |
| 5,353,388 | 10/1994 | Motoyama | 395/117 |
| 5,438,653 | 8/1995 | Boenke et al. | 395/131 |
| 5,542,052 | 7/1996 | Deutsch et al. | 395/131 |

FOREIGN PATENT DOCUMENTS 0 189 238 A1  7/1986  European Pat. Off. .

OTHER PUBLICATIONS

Elizer et al, "Trapping Test: comparing Aldus, Island Graphics, Rampage and Scitex . . . ", The Seybold Report on Desktop Publishing, v8 n6, pp. 3–34 Feb. 1994.

Tinkel et al, "Professional page layout: time to switch? (Evaluation of Aldus' PageMaker 5.0 . . . ", MacUser, v10 n2, pp. 108–117 Feb. 1994.

Staten, "Scitex sues Aldus in dispute over trapping technology patent", MacWeek, v8 N10, p. 32 Mar. 1994.

Staten, "IslandTrapper snatches batches, version 1.1 supports duotones, DCS files", MacWeek, v8 n5, p. 22 Jan. 1994.

*Primary Examiner*—Joseph H. Feild
*Attorney, Agent, or Firm*—Fish & Richardson P.C.

[57] ABSTRACT

The publication prolog of a PostScript page description language (PDL) or other PDL file is modified to create traps within an interpreter or raster image processor (RIP). The publication prolog is modified to provide the trapping instructions to the RIP, while the script is sent unmodified to the RIP. In a preferred embodiment, modification of the publication prolog to instruct the RIP includes creating a directory of the color objects in the publication, and trapping the color objects in the publication using the directory. Thereafter, the modified publication prolog and script are sent to the RIP and trap areas are created as the publication is rendered.

7 Claims, 12 Drawing Sheets

*TRAP PROLOG*

/RECTANGLE % THICKNESS LLx LLy URx URy TMX tm? RECTANGLE => -
{gsave
    CALL ROUTINE TO SET CURRENT TRANSFORMATION
    CALL ROUTINE TO SET BOUNDING BOX VARIABLES FROM STACK VALUES
    DEFINE THICKNESS FROM STACK VALUE
    COMPUTE PATH GEOMETRY
    STORE OBJECT IN SHAPE DIRECTORY
    DRAW PATH USING moveto, lineto, AND arcto COMMANDS
    FILL PATH
    SET THE LINE WIDTH
    STROKE PATH
    TRAP THE OBJECT AGAINST ALL OTHER OBJECTS IN SHAPE DIRECTORY
grestore
}def

*SCRIPT*

{BLACK  CALL ROUTINE TO SET FILL PATTERN
0   0021   0000   1.125   1.125   RECTANGLE
{WHITE  CALL ROUTINE TO SET FILL PATTERN
0.01   0021   0000   1   1   RECTANGLE

*Fig. 11.*

METHOD OF TRAPPING GRAPHICAL OBJECTS IN A DESKTOP PUBLISHING PROGRAM

CROSS-REFERENCE TO RELATED APPLICATIONS

This application is related to U.S. patent application Ser. No. 08/188,246, filed Jan. 26, 1994, U.S. Pat. No. 5,542,052 entitled "Applying Traps to a Printed Page Specified in a Page Description Language Format" and assigned to the assignee of the present invention, the subject matter of which is hereby incorporated by reference.

FIELD OF THE INVENTION

The invention generally relates to color trapping and, more particularly, to a method of creating traps for objects in desktop publishing programs.

BACKGROUND OF THE INVENTION

Color printing has traditionally required the integration of many unique and varied talents to see a project through from conception to a printed page. Prior to "desktop publishing," ideas or concepts were typically first drawn by hand and photographed, any text or illustrations added, and the aggregate of pictures and text used to produce a printed page. The traditional process generally required, in addition to design personnel, a paste-up person, typesetting bureau and a lithography department that would produce separations from the photographs. Desktop publishing has relieved some of the burden of publishers by allowing color production, i.e., drawing and layout, to be integrated electronically using personal computers. Color documents can now be designed, enhanced, color-corrected, and separated on a computer "desktop." The success of desktop publishing is, in large part, the result of standards-based computer programs such as the page description language (PDL) PostScript® from Adobe Systems Incorporated of Mountain View, Calif. The PostScript language has become the industry standard that serves as an intermediary between applications packages, e.g., desktop publishing programs, and PDL-compatible composite reproduction equipment, such as a desktop printer. The applications packages translate information for a page into PDL for transmission to the PDL-compatible desktop printer. The PDL-compatible printer includes an interpreter that converts the PDL code to low-level instructions that indicate to the printer how to render the text and graphics. Alternatively, the information can be transferred to a file for importation by another applications program or for use by a service bureau. The process of interpreting and rendering PDL is often performed within a raster image processor or "RIP." For further information on the PostScript programming language, please see *PostScript Language Reference Manual*, 2nd Ed., by Adobe Systems, Inc., published by Addison Wesley, which is hereby incorporated by reference.

A desktop printer uses toner to produce the colors comprising a color publication. Because composite printing is generally efficient only for small quantity jobs, larger quantities of the same publication are generally reproduced on a commercial printing press using ink. Methods of printing color publications using a commercial printer press include process-color printing, spot-color printing, or a combination of the two. Process-color printing separates the original image into its cyan (C), magenta (M), yellow (Y), and black (K) components to recreate the original shadings of color in the publication. This is accomplished by printing dots of the process-color inks in different combinations in close proximity to simulate a variety of colors on a printed page. Spot-color printing involves printing one or more specific colors (or inks) that have been specified according to a color matching system. One popular color matching system is the PANTONE™ MATCHING SYSTEM by Pantone, Inc. Spot-color printing is often used to produce colors that are not easily produced using CMYK inks, such as silver, gold, and fluorescent colors. Spot-color printing is also used in lieu of printing the four process colors, such as when only a couple of inks are required for a particular publication.

Before a color publication can be reproduced on a commercial printing press, each page containing composite art must be separated into its component colors by printing a film separation for each ink (cyan, magenta, yellow, and black, if process colors are to be printed) and any spot colors. Thus, process-color printing always requires four film separations. Spot-color printing requires a separation for each color being printed. A commercial printer uses these film separations to create the printing plates used on the press. For instance, if one specifies the four process colors and a single spot color in a publication, there will be five separations, and hence printing plates, for each page. A separate component ink is added by each plate as the pages in the publication pass through the press. For a more detailed explanation of the commercial printing process, please see the *Commercial Printing Guide* from PageMaker®, Version 5.0. PageMaker® is a desktop publishing program produced by Aldus Corporation, the assignee of the present application. The PageMaker 5.0 *User Manual* and *Commercial Printing Guide* are hereby incorporated by reference. For additional information on desktop publishing generally, see *Desktop Publishing in Color* by Michael Kieran, published by Bantam Books (1991), which is also incorporated by reference.

High-quality printing, such as that required by the publishing industry, poses many difficult problems in controlling the separations. For example, color printing is compromised if paper is not properly aligned as it makes multiple passes through the plates of a printer. This problem is typically referred to as misregistration. One common solution to the registration problem is to perform a technique known as trapping. Trapping refers to expanding or "spreading" regions of a particular color beyond its normal boundaries, and contracting or "choking" a color region so that a small overlap exists between graphical objects where misregistration may occur. Trapping techniques have traditionally been performed manually. Although tedious, in the past, manual trapping techniques have been used in applications such as magazine publishing, where the time and labor required to create individual traps for each printed page are economically justified.

In recent years, computer systems that perform choking and spreading electronically have come into widespread use. A typical approach has been to: (1) start with a PDL file such as a PostScript file; (2) convert the vector graphics and/or text within the PDL file into a raster (bit mapped) image through a RIP; and (3) trap the raster image using pixel data comprising the image. The third step usually requires a creation of a separate frame buffer for each of the process colors. Each frame buffer is then choked and spread on a pixel-by-pixel basis, and the result used to control the printing of its respective color. As will be appreciated, this approach is very memory intensive.

A more recent approach to electronic trapping is set forth in U.S. Pat. No. 5,295,236 ("'236 patent"), titled "Applying Traps to a Printed Page Specified in a Page Description Language Format" and assigned to the assignee of the present invention. The '236 patent discloses a method and apparatus for electronically trapping a printed color page in a desktop publishing, layout, graphics, or similar applications program. The method translates PDL instructions comprising the printed page into a format suitable for detection and analysis of edges between color regions in the printed page; creates, according to a set of trapping rules, a set of traps between the color edges; and produces a trap output file that includes the traps expressed in the PDL format. Such a method is referred to as a "post-processing approach." An advantage to the method described in the '236 patent is that virtually any printed page that is expressed in a PDL format may be trapped regardless of the application that originally created the graphics, i.e., the originating program. However, this capability is at the expense of software complexity. In particular, the PDL file must be interpreted before traps are created.

Another approach to electronic trapping is to have the originating program also create traps for the graphics. As an example, in drawing programs such as Aldus Freehand®, a user is allowed to add outlines around objects to accommodate trapping. Trapping approaches at the originating program level are beneficial because additional trapping costs may be eliminated, i.e., it is not necessary to utilize a post-processing program or traditional trapping techniques. However, the capability to perform trapping in originating programs is relatively new, and has typically required extensive reworking of the computer code comprising the programs. This, in turn, requires a new release of the software, and involves associated costs with such a release, including extensive debugging. Further, trapping capabilities in originating programs have typically been very limited. One shortcoming is apparent in situations where the background and/or foreground is formed by a number of differently colored objects. This situation arises, for example, where individual text characters overlap more than one object. Typical originating programs with trapping capabilities tend to handle objects such as text or boxes in a relatively course fashion, such that traps are only able to be applied to an entire text block, or at best an entire character. Thus, the trap results in these instances are less than desirable.

In contrast to the prior art discussed above, the invention alleviates the need to change the computer code of the originating application to provide trapping capabilities and reimplement the PDL interpreter. Hence, a trapping method implemented in accordance with the invention may be created, debugged, and distributed independent of the desktop publishing program. Further, as will be described in detail below, the invention allows very accurate trap placement, thus providing results superior to trapping solutions currently available in originating programs.

SUMMARY OF THE INVENTION

The invention is a method of electronically trapping a printed page that includes a plurality of objects expressed in a page description language, with the page description language instructions being interpreted by a raster image processor for output to an output device. The method comprises the step of providing instructions to the raster image processor to trap the objects in the page as the page description language instructions comprising the objects are interpreted by the raster image processor.

In accordance with other aspects of the invention, the printed page is in a publication in a desktop publishing program. The publication including a prolog and a script that specify the objects to be printed. The method further includes the step of modifying the publication prolog to provide the trapping instructions to the raster image processor. Further, the script is sent unmodified to the raster image processor.

In accordance with still further aspects of the invention, the printed page is in a publication in a desktop publishing program. The method comprises the steps of: (a) modifying the publication prolog to instruct the raster image processor to (i) create a directory of the color objects in the publication and (ii) trap the color objects in the publication using the shape directory; and (b) sending the modified publication prolog and script to the raster image processor wherein trap areas are created as the publication is rendered.

BRIEF DESCRIPTION OF THE DRAWINGS

The above and further advantages of the invention may be better understood by referring to the following description together with the accompanying drawings, wherein:

FIG. 11 is a block diagram of the PDL publication illustrated in FIG. 10, but including modifications to the prolog to provide trapping of the publication during the rendering process at the RIP;

DETAILED DESCRIPTION OF THE PREFERRED EMBODIMENT

Figure 1:
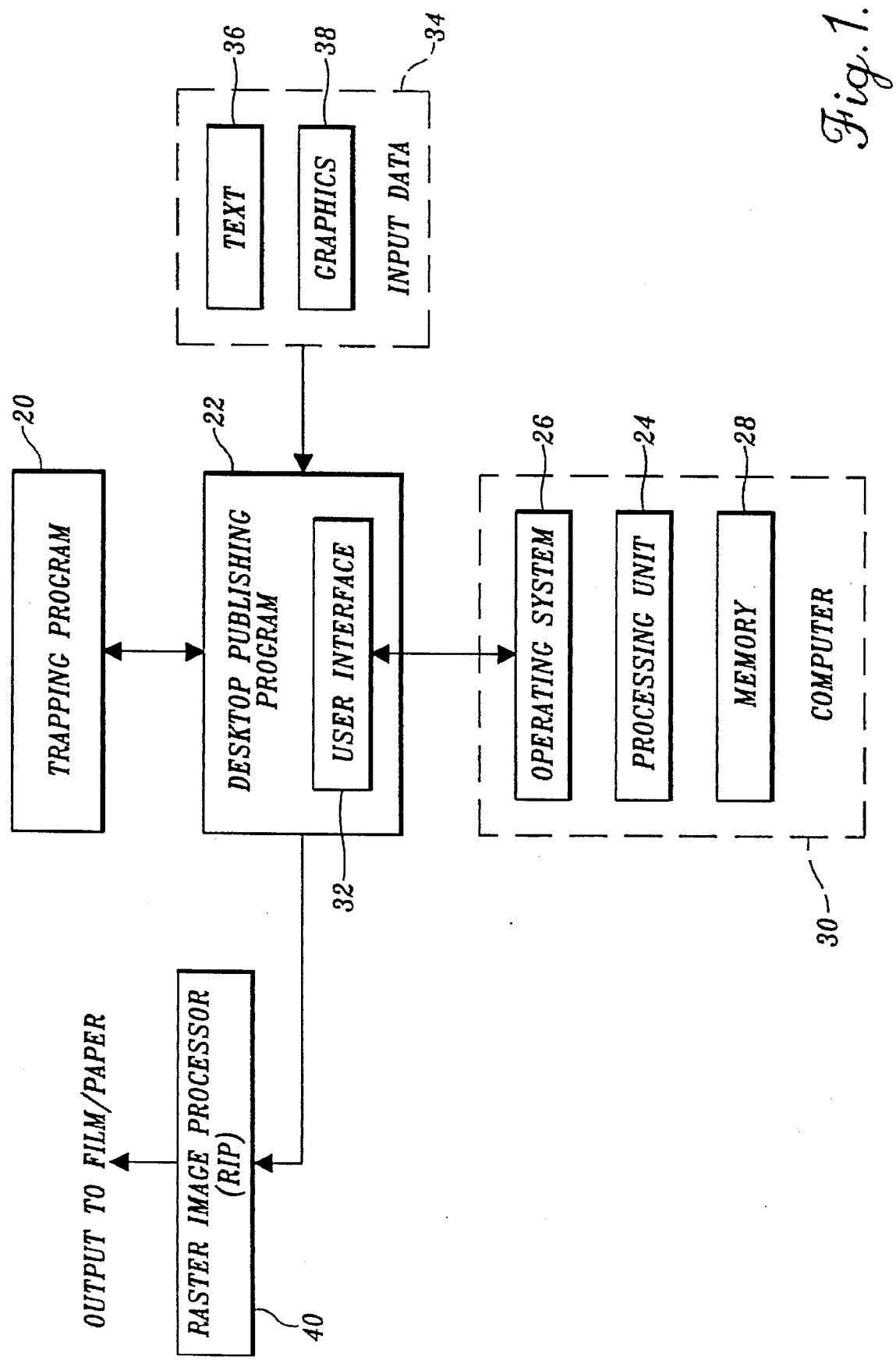
FIG. 1 is a block diagram of a trapping program in accordance with the invention that works in conjunction with prior art desktop publishing programs to trap a publication as it is being rasterized by a raster image processor (RIP)

A trapping program 20 in accordance with the invention is illustrated in FIG. 1. The trapping program 20 works in conjunction with a computer program, such as a desktop publishing program 22, that is suitable for incorporating text, graphics and other aspects of documents to be published. The desktop publishing program 20 may be, for example, the PageMaker® desktop publishing program sold and supported by Aldus Corporation, the assignee of the present invention. It is noted, however, that the benefits of the invention are not limited to use with an application whose primary purpose is to combine text and graphics. Thus, throughout the specification and claims, the term "desktop publishing program" is hereby defined as any computer program that has the ability to manipulate graphical objects, including programs such as presentation, art, and drawing programs.

The trapping and desktop publishing programs 20 and 22 run on a processing unit 24 controlled by an operating system 26. Memory 28 is connected to the processing unit and generally comprises, for example, random access memory (RAM), read only memory (ROM), and magnetic storage media such as a hard drive, floppy disk, or magnetic tape. The processing unit and memory are typically housed within a personal computer 30, including Macintosh™, International Business Machines (IBM™), and IBM-compatible personal computers. When used with IBM and IBM-compatible personal computers, the operating system 26 may incorporate a windowing environment such as Microsoft Windows™.

The desktop publishing program 22 includes a user interface 32 that interacts between the operating system 26 and the internal process application of the desktop publishing program 22. Using the desktop publishing program 22, an author creates the text, images, and graphics comprising a publication. Text, images and graphics are generically referred to as "objects" through the specification and claims. In many cases, the data comprising a publication is also imported from one or more sources including, for example, illustration, image enhancement, word processing, and desktop publishing programs. At block 34, input data including text 36 and graphics 38 that were created within or imported into a publication are shown. After the input data comprising a publication have been entered, the data may be trapped using the trapping program 20. As will be apparent from the following discussion, this is accomplished by sending instructions to a PostScript (PS) interpreter or raster image processor (RIP) 40, e.g., within a printer or at a service provider, to trap the objects in the publication as the PS instructions comprising the publication are being interpreted. The RIP 40 then outputs the data comprising the trapped publication to film or paper.

Prior to discussing the specific details of how trapping is accomplished by the trapping program 20, background information on the operation of PDL languages, and directed specifically toward the PS language, is provided. While the remainder of this discussion focuses on the PS language, those skilled in the art will appreciate that the ideas presented are applicable to other page description languages as well.

Figure 2:
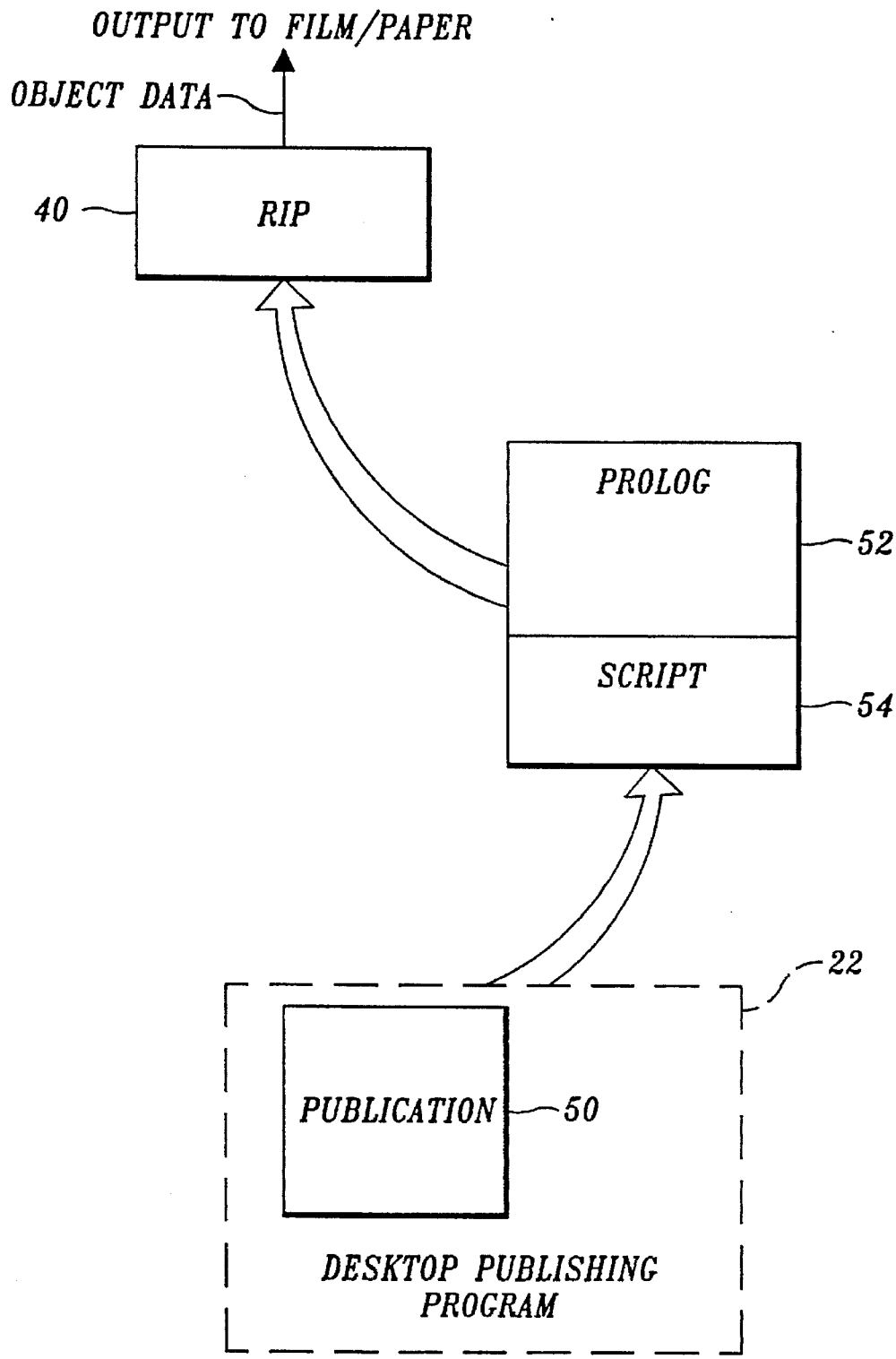
FIG. 2 is a block diagram illustrating a PDL publication, including a prolog and script, being sent to a RIP by a desktop publishing program in accordance with conventional procedure.

With reference to FIG. 2, the recommended structure for a PDL file such as a PS publication 50 file is that it contain two basic components: a prolog 52 and a script 54. The prolog 52 contains routines or procedures, as well as named variables and constants, that will be used throughout the rest of a publication. As is known by those skilled in the art, it is efficient to have a routine to perform a given task that will be repeated multiple times, e.g., drawing a line, box, or oval, and then call the routine with the appropriate parameters. In contrast, a more burdensome approach would be to set forth all of the instructions contained in the routine each time a line, box, or oval is to be drawn. The prolog is written by a PDL programmer, and will precede the first part of every publication, or script, that uses it. The script 54 provides the setup for the publication and describes the specific elements to be produced as the output in terms of procedures and variables defined in the prolog, along with operand data.

When a user of the desktop publishing program enters the print command, the prolog 52 and script 54 are sent to the RIP 40 where the PDL language is interpreted and converted into a bit map format. The bit map is used to draw the objects in the publication on paper or film.

Figure 3:
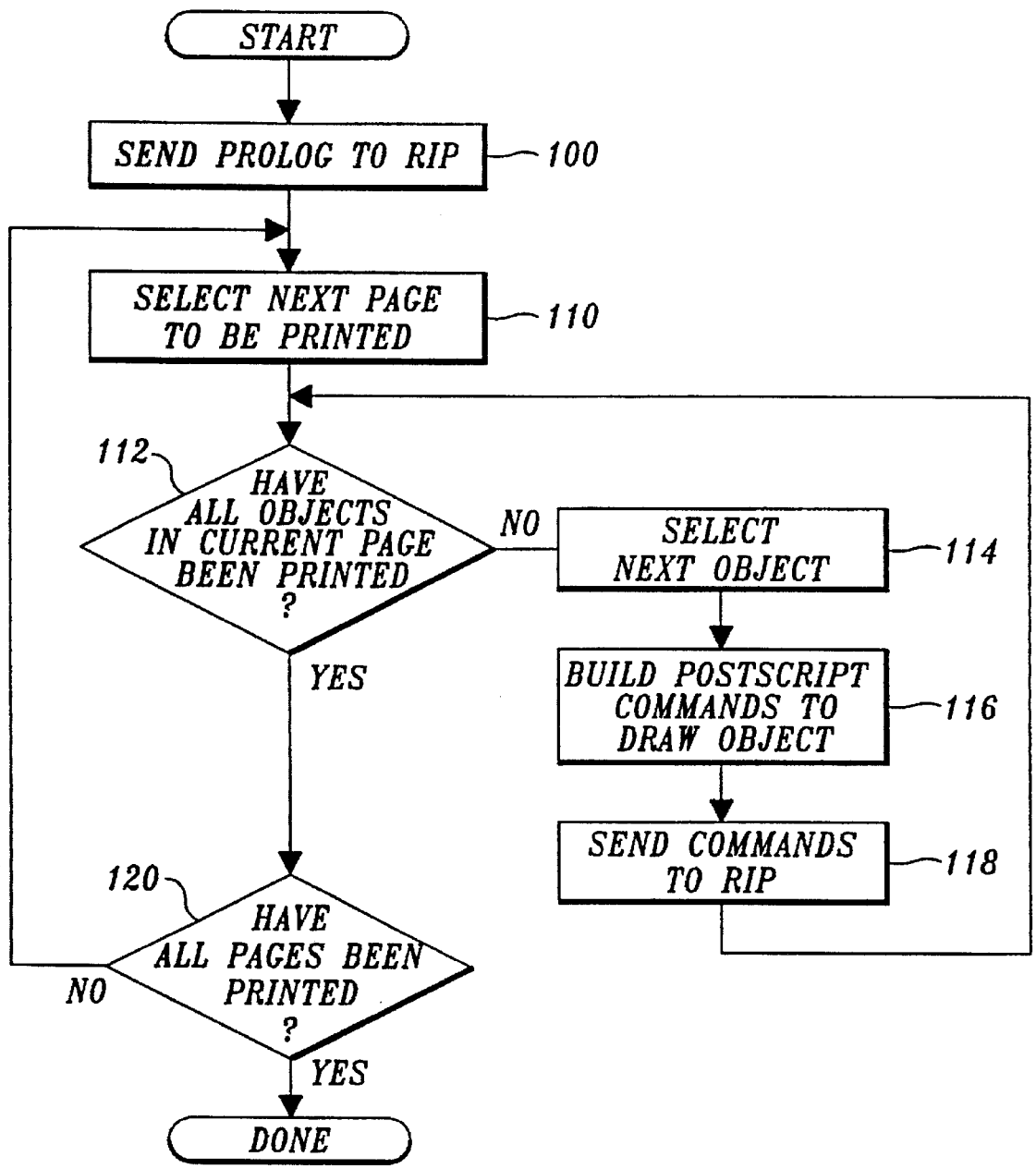
FIG. 3 is a flow chart illustrating a conventional procedure by which a desktop publishing program sends information to a RIP enabling it to draw a publication.

FIG. 3 is a flow diagram of a prior art routine that illustrates the construction of a publication written in PS language at the interpreter/RIP level. At block 100, the prolog from the publication is sent to the RIP. The next (current) page to be printed is then targeted for "printing" at block 110. Printing in this context refers to sending the PS commands to a RIP, and not necessarily the act of placing ink on paper. At block 112, a test is made to determine whether all objects in the current page have been printed. If all objects in the current page have not been printed, the next object to be considered is selected at block 114. At block 116, the appropriate PS commands are constructed to create the object. The PS commands are then sent to the RIP at block 118, and the routine loops to block 112.

Figure 4:
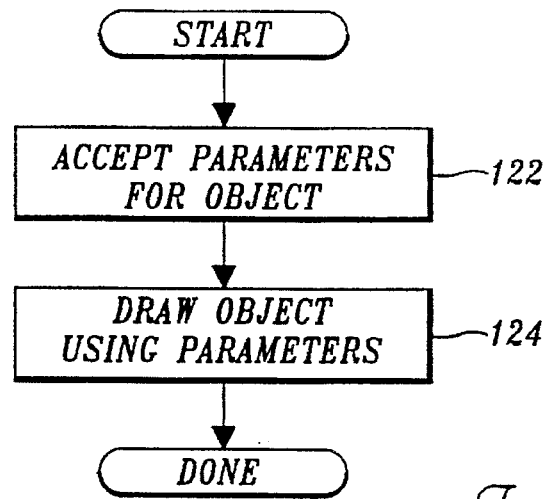
FIG. 4 is a flow chart illustrating the internal procedure followed by a conventional RIP to draw an object in a PDL publication.

If all the objects in the current page were determined to be printed at block 112, a test is made at block 120 to determine if all pages in the publication have been printed. If all pages in the publication have not been printed, the routine loops to block 110. Otherwise, the routine is terminated and the RIP is ready to begin converting the PS code comprising the publication into a format acceptable to an output device such as an imagesetter (creating film) or a printer. FIG. 4 illustrates a simplified, genetic version of the process that occurs at the RIP for any given object to be printed. More particularly, at block 122 the parameters for the object are accepted. These were created and sent to the RIP by blocks 116 and 118 of FIG. 3. The object is then drawn using the parameters, as indicated at block 124. The routine then terminates.

Figure 5:
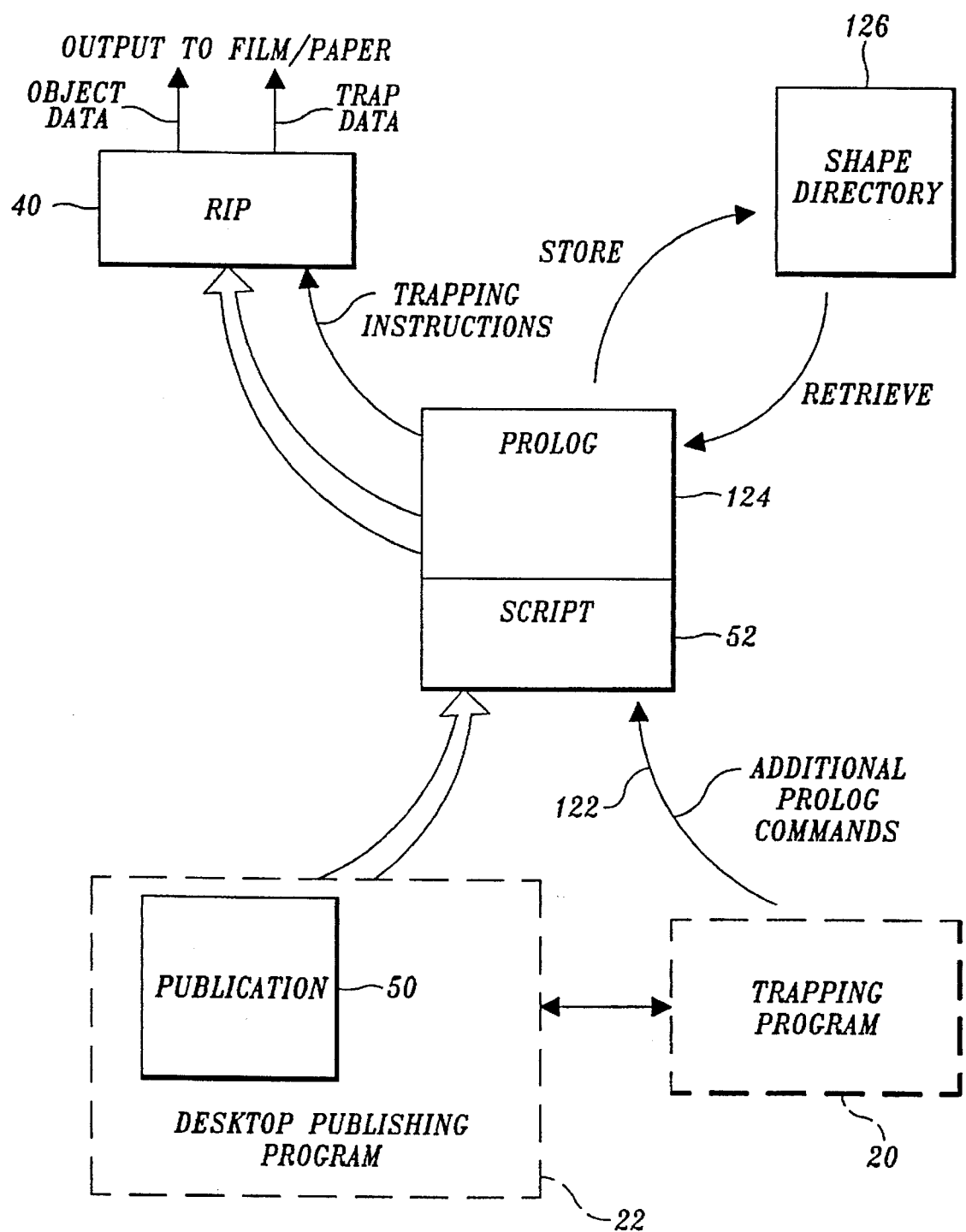
FIG. 5 is the block diagram of FIG. 2 but including revisions that illustrate the sending of additional prolog commands to the RIP to facilitate trapping of the publication in accordance with the invention.

The flow diagram of FIG. 4 illustrates precisely what PostScript was intended to do: Indicate to an interpreter/RIP objects to be printed and then have the commands carried through. In other words, the function of the RIP has traditionally been to simply draw objects in a publication in accordance with the PDL commands sent to it. In contrast, the invention extends the function of the RIP beyond traditional Concepts by instructing the RIP to create traps for objects at the interpretation/rasterization level. FIG. 5 illustrates this concept pictorially. The procedure is similar to FIG. 2, but includes the following new steps. First, prolog commands 122 that instruct the RIP to trap objects in the publication 50 are created by the trapping program 20 and forwarded to the RIP, along with the traditional prolog commands and the script comprising a publication. More specifically, the prolog 54 is substituted with a trapping prolog 124. It is noted that the script itself does not change, and thus this portion of the code within the desktop publishing program 22 need not be modified.

At this point, all control of the publication is at the RIP 40. The RIP interprets the PS instructions in the trap prolog 124, which indicate that a listing, referred to as the "shape directory" 126, is to be created of the objects in the publication as the objects are drawn. Additional PS instructions in the trap prolog 124 indicate that the objects in the publication, including text and graphics, are to be trapped using the shape directory, with the objects and resultant traps being rasterized and sent to an output device by the RIP.

Figure 6:
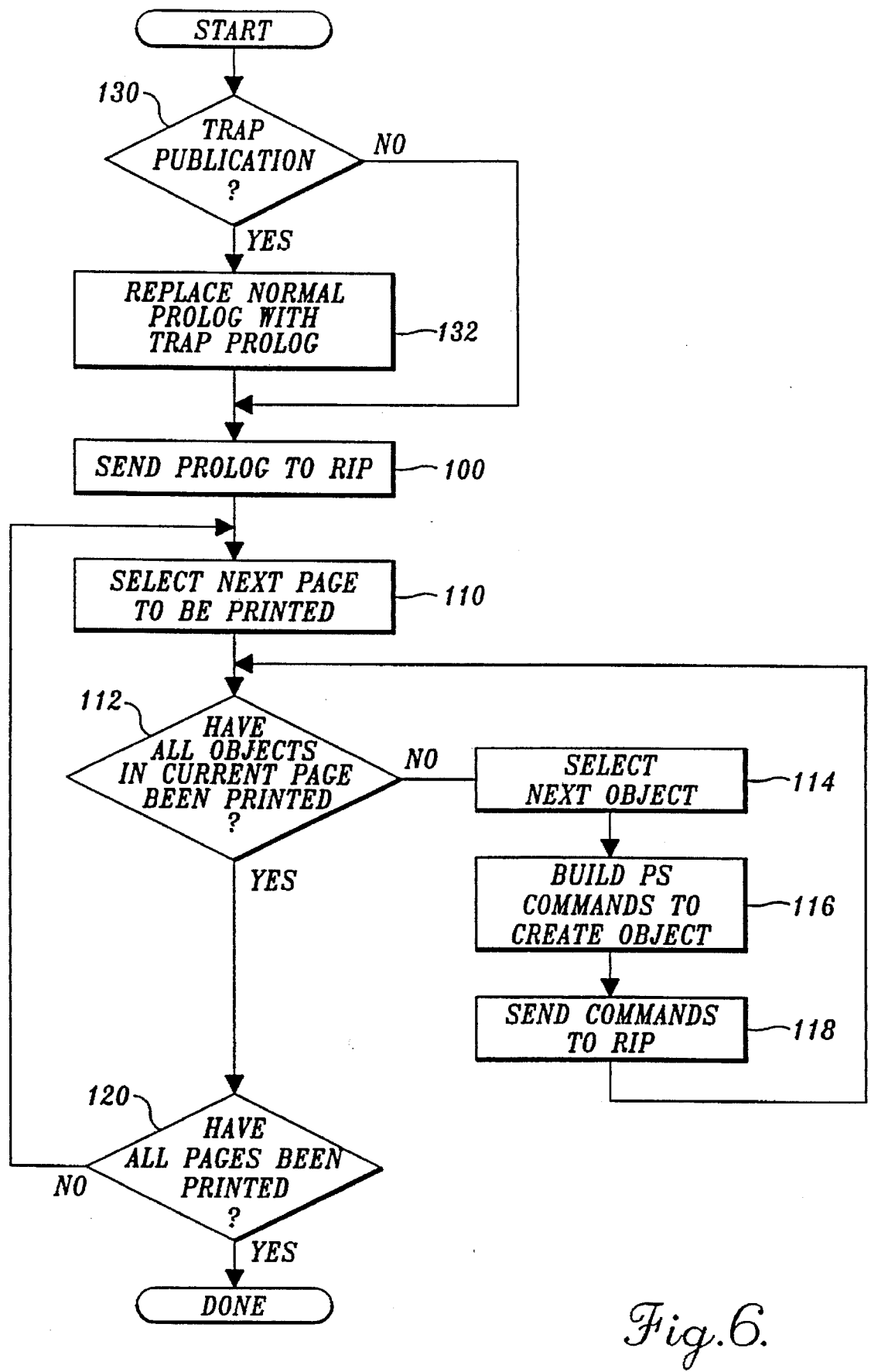
FIG. 6 is a flow chart of an exemplary routine by which a desktop publishing program sends information to a RIP enabling it to trap a publication in accordance with the invention.

FIG. 6 illustrates an exemplary routine for implementing the trapping program 20 in conjunction with a desktop publishing program. At block 130, a test is made to determine whether a user wishes to trap a publication in the desktop publishing program. In one embodiment, the user will indicate that a publication is to be trapped prior to invoking the "print" command. If the current publication is to be trapped, at block 132 the preamble normally associated with the publication is replaced with a trap prolog. It will be apparent to those skilled in the art how to facilitate substitution of the normal prolog with the trap prolog for the desktop publishing program of interest. For example, in the Macintosh™ Version of the PageMaker 5.0 program, the prolog used for a given publication will typically be the one that was most recently opened in the current session. Thus, the trapping program will ensure that the trap prolog is referenced if trapping is desired, and not otherwise. As an alternative to this scheme, the PageMaker 5.0 program will look for a particular file that, if it contains a prolog, will override earlier versions of the prolog. This option may be used in lieu of the one described above. Similarly, other desktop publishing programs have methods of accomplishing the substitution.

After the prologs have been substituted, the trap prolog is sent to the RIP at block 100. If the publication is not to be trapped, the routine skips the prolog replacement step at block 132, and loops to block 100 where the normal prolog is sent to the RIP. Blocks 110–120 have identical functions as those shown and discussed relative to FIG. 3.

Figure 7:
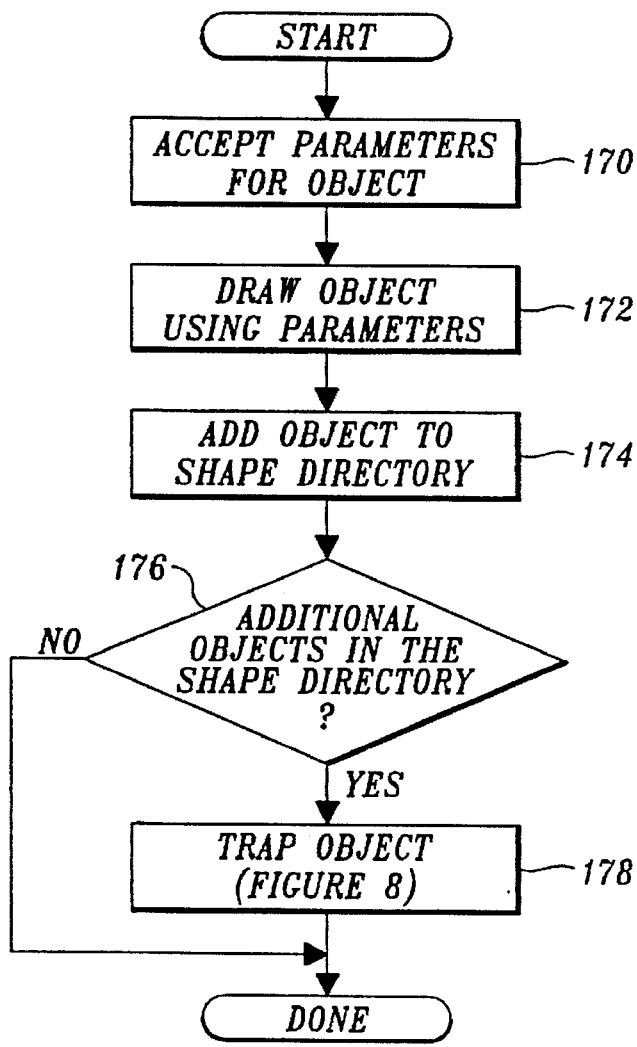
FIG. 7 is a flow chart of an exemplary routine illustrating how traps are created for objects by the RIP in accordance with the invention.

FIG. 7 illustrates the steps performed by the RIP in printing an object after receiving the trap prolog from the trapping program 20 and the script from the desktop publishing program 22. At block 170, the parameters from the script are accepted for an object to be printed, termed the "current object." At block 172, the object is drawn using these parameters. The object is added to a shape directory at block 174. In a preferred embodiment, only graphical objects are stored in the shape directory, although it may be advantageous to include text in the listing in certain applications. A test is made at block 176 to determine if there are any additional objects in the shape directory. If there are objects in the shape directory, the current object is trapped against those objects, as indicated at block 178. Once the current object has been trapped, or if there were no additional objects in the shape directory, the routine terminates.

Figure 8:
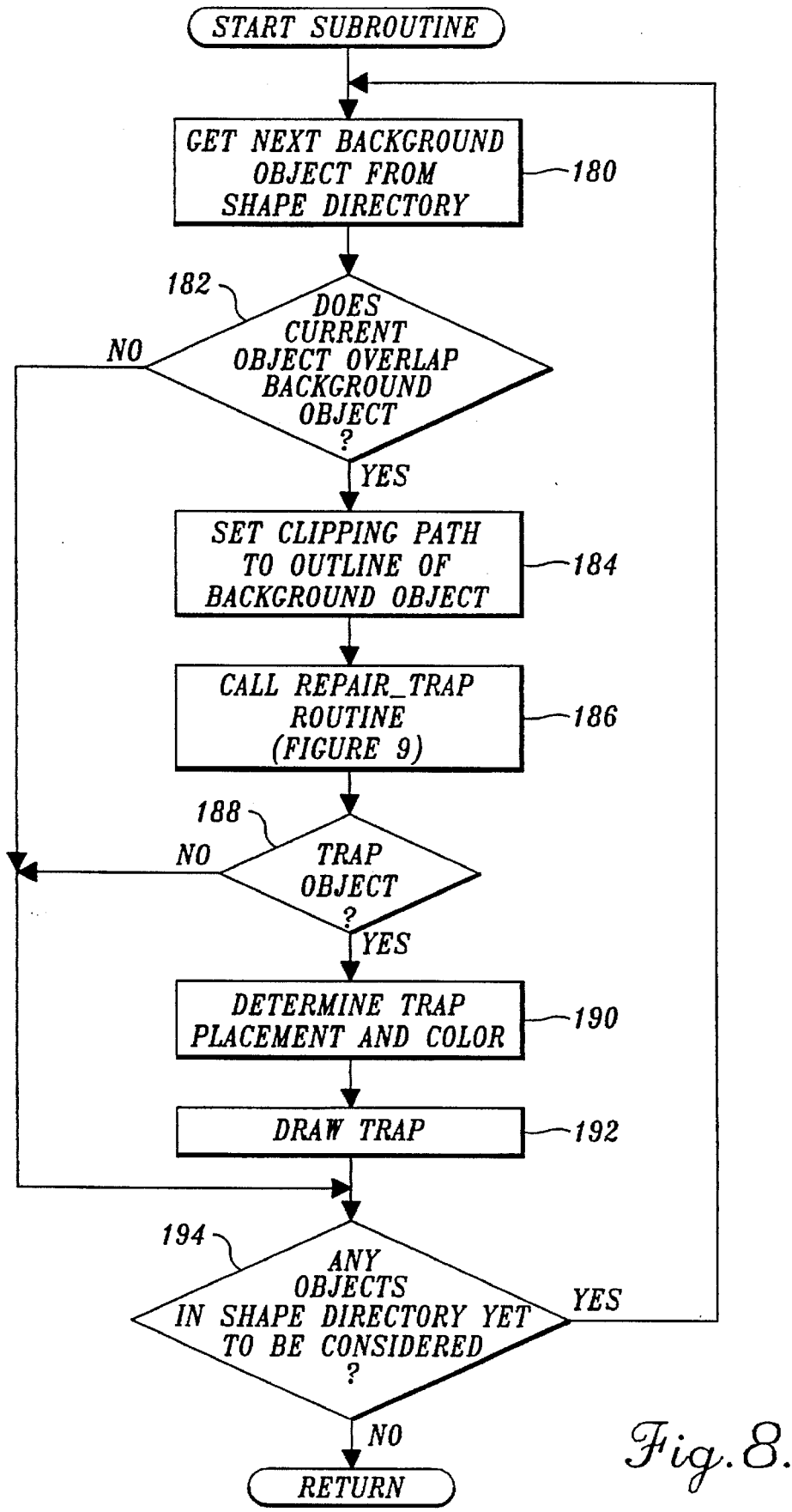
FIG. 8 is a flow chart illustrating how objects are trapped within the RIP in accordance with the invention, as a result of the instructions created and sent to the RIP in FIG. 6.

FIG. 8 is a routine suitable for use in FIG. 7 for trapping the current object being printed in a publication. At block 180, an object from the shape directory is retrieved. The most recently retrieved object from the shape directory is referred to as the "background object" throughout the flow diagram and this discussion. In a preferred embodiment, the objects in the shape directory are retrieved on a first-in, first-out basis, with the bottom-most objects being among the first to be added to the shape directory, and the top-most object being last. Those skilled in the art will appreciate that this bottom-to-top scheme is a direct result of the intricacies of how PostScript handles objects and clipping of objects internally. Other page description languages, or future versions of PostScript, might support a top-to-bottom or hybrid approach, if this is desirable. In this sense, the particular retrieval order is not germane to the invention.

At block 182, a test is made to determine whether the current object overlaps the background object. As will be appreciated by those skilled in the art, if the current object does not overlap the background object, there is no need to create a trap between these objects. If the current object overlaps the background object, a clipping path is set to the outline of the background object at block 184. The effect of setting the clipping path will be for the RIP to ignore everything on the page except for the background object and any object that overlaps the background object. At block 186, a subroutine Repair_Trap is called. This routine will remove parts of unwanted traps that were added but are not ideal solutions because of multiple overlapping objects, as discussed further below.

At block 188, a test is made to determine if the current object is to be trapped and, if so, the color and placement of the trap are set at block 190. The trap is then drawn according to the color and placement determinations, shown at block 192. Once the trap for the current object is drawn at block 192, or if it was determined that the current object was not to be trapped, or if the current object did not overlap or abut the trapped object as determined at block 182, a test is made at block 194 to determine whether any background objects that have yet to be considered in the shape directory. If there are objects remaining, the routine loops to block 180 where the next background object is retrieved from the shape directory. Otherwise, the routine terminates and control is returned to block 176 of FIG. 7.

The decision of whether or not a trap should be created, as determined at block 188, may be based on a number of different criteria. For example, it may be acceptable to refrain from trapping text below a certain point size, e.g., 24 points. In a preferred embodiment, this is a user-definable variable. Step limits may also be implemented, such that a trap is not created if the relationship of the colors of two intersecting objects is within a given threshold. The threshold may be determined by realizing that the effort expended in trapping certain color intersections outweighs the benefit of the trap. It is noted that it may be more efficient to make at least some of these determinations earlier in the process, as opposed to making them at block 188. For additional criteria in determining whether or not a trap should be created, and for criteria on determining trap placement and color, please refer to U.S. patent application Ser. No. 08/188, 246, entitled "Applying Traps to a Printed Page Specified in a Page Description Language Format," which was already incorporated by reference.

Figure 9:
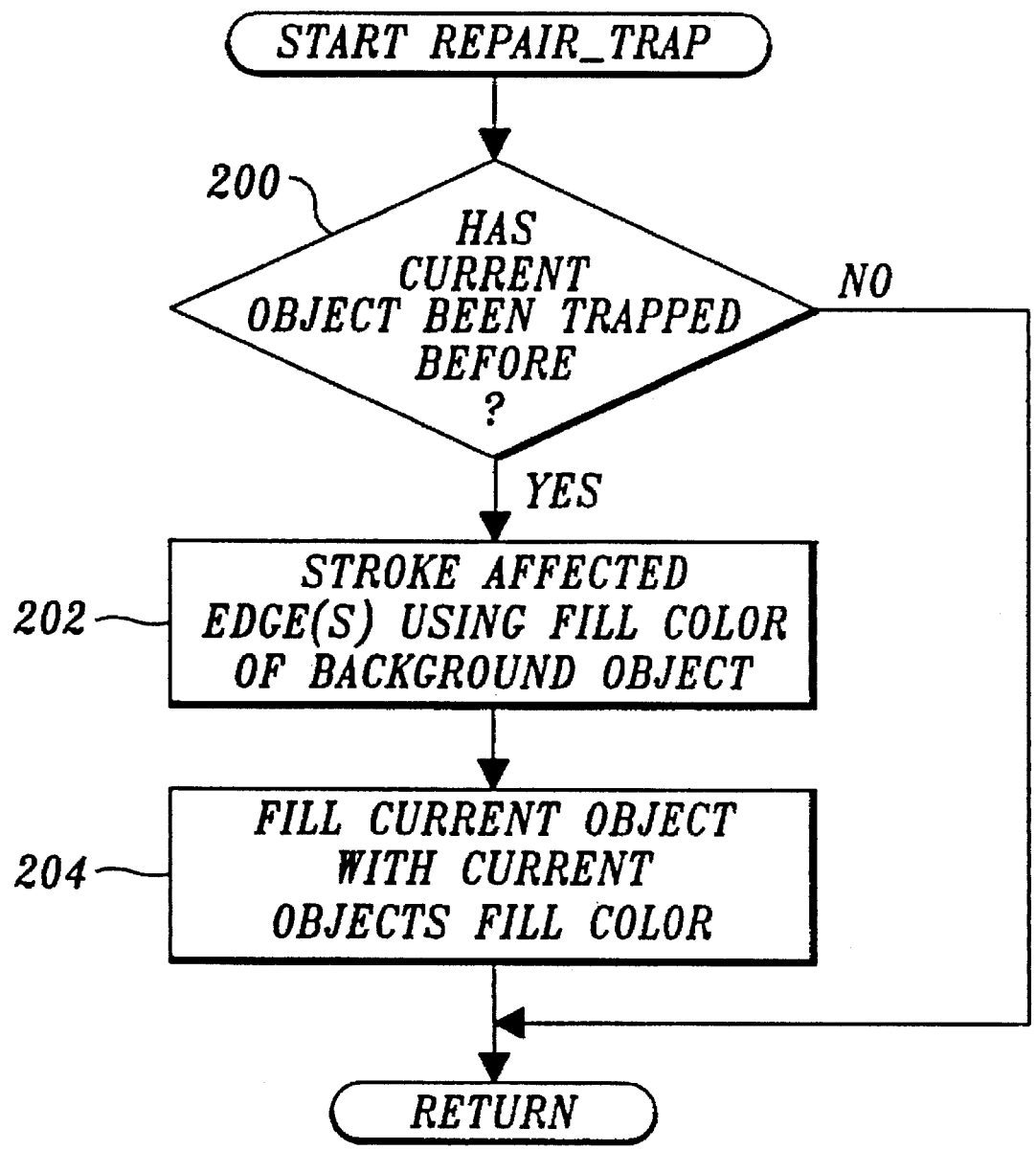
FIG. 9 is a flow chart of an exemplary routine in accordance with the invention for revising a trap created for a background object when multiple overlaps interfere with the trap.

FIG. 9 is an exemplary subroutine that takes into account errors that may be created using the trapping program 20 when three or more objects overlap one another. A test is made at block 200 to determine whether the current object has been trapped before, i.e., has any trapped edges. If the current object has been trapped before, it is advantageous to remove the prior trap from any edge or portion thereof that intersects the background object. This is because the background object that is currently being considered may overwrite the former background object that caused the trap to be created in the first place. In turn, the former trap may interfere with a trap to be created between the current object and the background object currently being considered, producing spurious results. In other words, if it was determined that the current object has been trapped prior to this pass, and since it is known that the background object under consideration intersects the current object (from block 182 of FIG.

8), it is preferable to eliminate the earlier trap at the areas in which there is an overlap. Please refer to FIGS. 14A–14C for additional explanation.

The elimination of an earlier-created trap, or portion thereof, may be accomplished by stroking the overlapping or affected edge(s) or portions thereof with the fill color of the background object, as shown in block 202. While this step will remove the previous trap from the background object, it will have the negative effect of drawing the background color onto part of the current object. This result is the phenomenon of the PS language, in that the entire centerline comprising the trap must be redrawn, and the redraw will extend into both the current and background objects.

To eliminate the negative effect of stroking the affected edge, the current object is filled with the current objects fill color at block 204. Once the current object has been redrawn with its fill color, or if it was determined that there were no traps drawn against the current object at block 200, the subroutine terminates and control is returned to block 186 of FIG. 8. Thereafter, a trap will be created, if desired, between the current and background objects at their intersecting edge(s).

Figure 10:
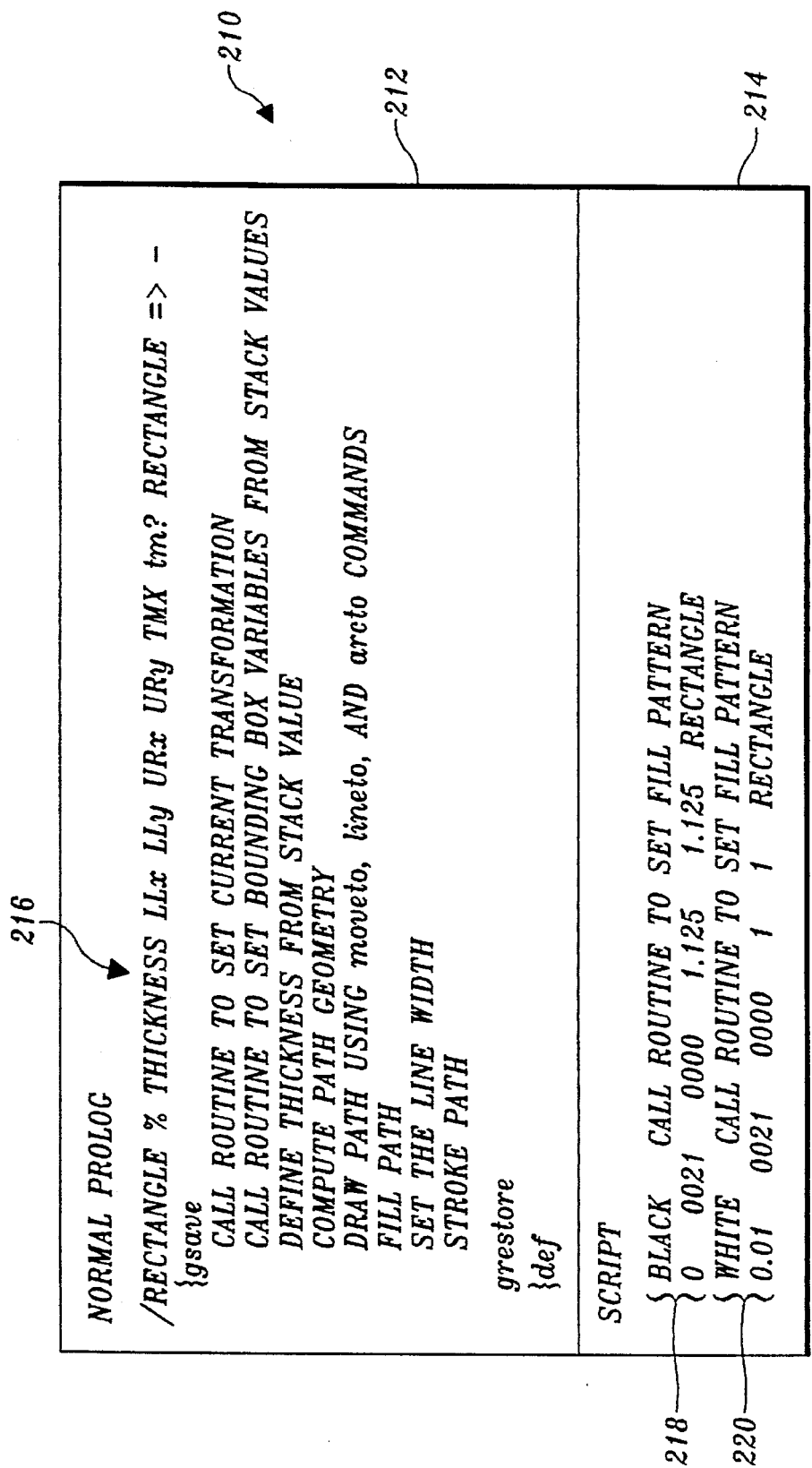
FIG. 10 is a block diagram of a simplified PDL, e.g., PostScript, publication, including a prolog and script written in pseudo code.

The remainder of the Detailed Description and accompanying drawings set forth examples that facilitate a more thorough understanding of the invention. FIG. 10 illustrates a simplified publication 210 having a prolog 212 and a script 214. The prolog 212 includes a single procedure 216 labeled "Rectangle" that may be used for creating rectangles and the like within the publication using the desktop publishing program. The script 214 includes two exemplary calls 218 and 220 to the procedure 216, each causing a rectangle to be drawn of an indicated size, at an appropriate position, and at a necessary rotation, as well as any other variables necessary for drawing the object. When the publication is to be printed, the prolog and script commands are sent to the RIP, which interprets, rasterizes and outputs the resultant bit map to a printer or film. It is noted that the commands shown in FIG. 10 are in pseudo code, and do not necessarily correspond to actual PS commands.

FIG. 11 illustrates the modification made to the prolog 212 of FIG. 10 in order to accommodate trapping in accordance with the invention. Specifically, a trap prolog 222 to accomplish trapping includes the addition of two lines of pseudo code to the original prolog 212. Namely, line 224 stores objects in the shape directory as they are being drawn. As was discussed above, in a preferred embodiment, only the graphical objects are stored, and not text. The second line of code added, line 226, traps the object currently being drawn against all the other objects in the shape directory. Trapping of the object may be accomplished by the routines set forth in FIGS. 7 and 8 and accompanying text. It is noted that FIGS. 10 and 11 are illustrative only, and actual PS commands and subroutine must be inserted in order for the routines to be executable.

Figure 12C:
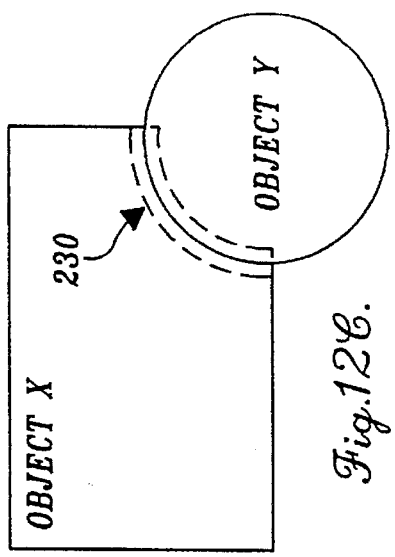
FIGS. 12A–12C illustrate a trapping example involving exemplary objects X and Y to facilitate explanation of the invention.
Figure 12B:
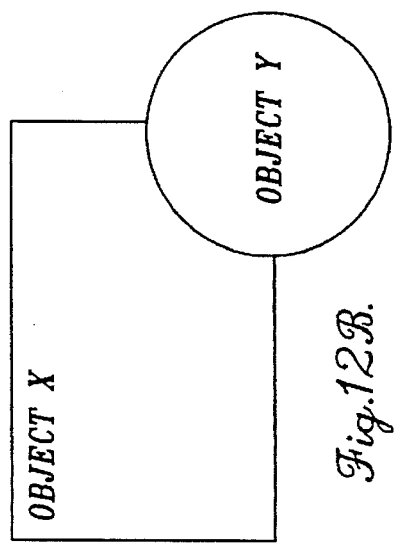
Figure 12A:
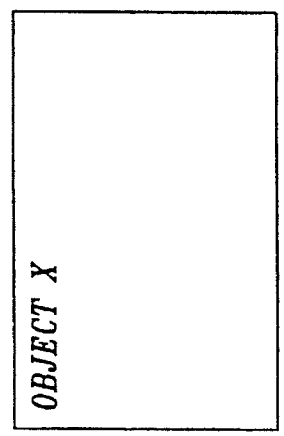

FIGS. 12A–12C illustrate a foreground Object Y that is to be trapped against a background Object X. This discussion begins with the routine of FIG. 8, and assumes that both Object X and Y were drawn and added to the shape directory using the routine of FIG. 7. At block 176, there is one additional object in the shape directory (Object X), and the trapping routine of FIG. 8 is called. Object Y is the "current object" under consideration.

With reference to block 182 of FIG. 8, since Object Y overlaps Object X (FIG. 12B), it may need to be trapped. The clipping path is set at block 184 and Repair_Trap is called at block 186. Since Object Y has not been trapped before (block 200, FIG. 9), control returns to block 188 of FIG. 8. Assuming that Object Y is to be trapped, the trap color and placement are determined at block 190 and a trap 230 is drawn at block 192. As there are no other objects in the shape directory, the process is complete and control returns to the routine of FIG. 7, which has also been completed.

Figure 13C:
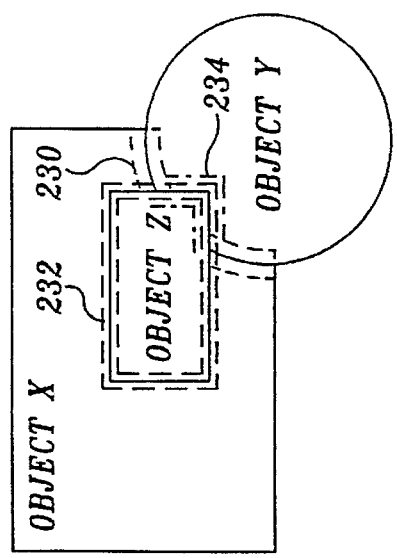
FIGS. 13A–13C illustrate the trapping example of FIGS. 12A–12C but including a third object Z that overlaps the original objects.
Figure 13B:
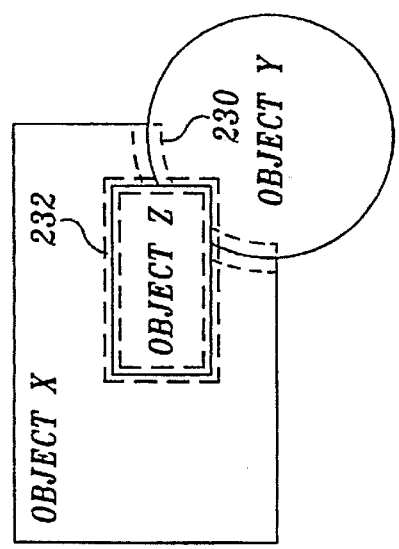
Figure 13A:
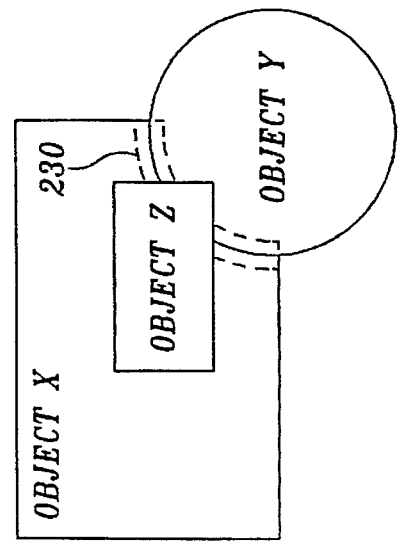

FIGS. 13A—13C illustrate the addition of a third Object Z to the above example, and further assumes that the routine Repair_Trap is not implemented. Beginning with FIG. 13A, the Object Z is drawn and added to the shape directory using blocks 172 and 174 of FIG. 7. At block 176, there are additional objects in the shape directory (Objects X and Y), and the trapping routine of FIG. 8 is called. Object Z is the "current object" under consideration.

With reference to block 182 of FIG. 8, the background object first considered is Object X, as the objects from the shape directory are retrieved from the bottom up. Since Object Z overlaps Object X, it may need to be trapped against Object X. The clipping path is set at block 184. In this example, it is assumed for illustrative purposes that Repair_Trap is not implemented, and thus block 188 is considered. Assuming that Object Z is to be trapped, the trap color and placement are determined at block 190 and a trap 232 is drawn at block 192. An exemplary trap 232 is shown in FIG. 13B. The trap 232 is a trap resulting from the intersection of Objects X and Z, and Object Y has not yet been taken into account. Once the trap for this intersection is drawn in block 192, a test is made at block 194 to determine if any objects remain in the shape directory that have not been considered. Object Y has yet to be considered, and the routine loops to block 180 where Object Y is retrieved. Object Y is now the "background object" being compared to the current object, Object Z.

With reference to block 182, since Object Z overlaps Object Y, it may need to be trapped against Object Y. The clipping path is set at block 184. Again, Repair_Trap is not called due to the assumption stated above. Assuming that Object Z is to be trapped against Object Y, the trap color and placement are determined at block 190 and a trap 234 is drawn at block 192. Trap 234 is shown in FIG. 13C. At this point, there are no other objects in the shape directory to be considered, and the process is complete. Thus, control returns to the routine of FIG. 7, which has also been completed.

Figure 14C:
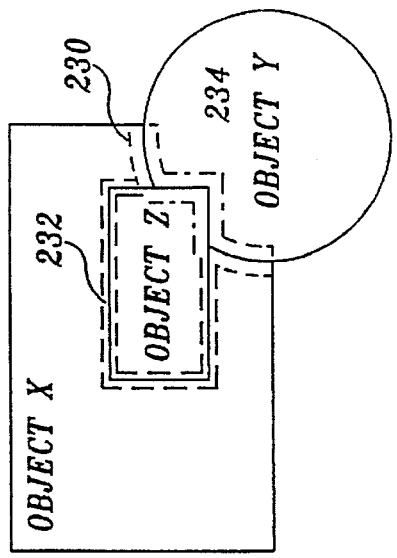
FIGS. 14A–14C illustrate the repairing of a previous trap in accordance with the procedure set forth in FIG. 9.
Figure 14B:
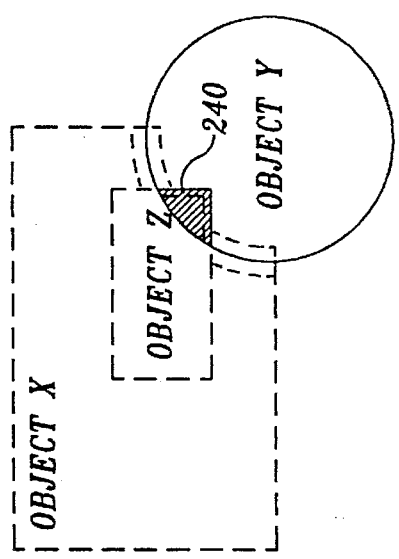
Figure 14A:
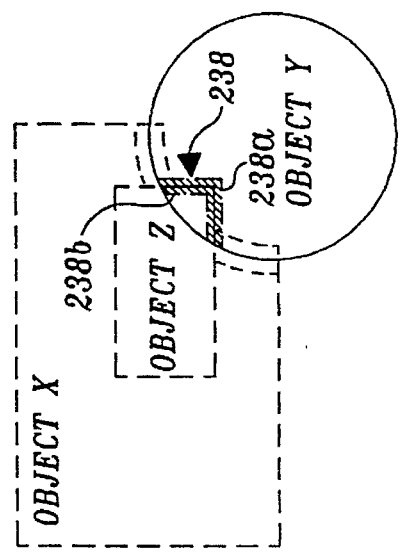

As can be seen, the result in FIG. 13C is less than ideal, because the traps 232 and 234 have combined to form overlapping traps. FIGS. 14A–14C illustrate the effects of the Repair_Trap routine to accommodate the problem that may occur when three or more objects overlap in the same area of a page, as shown in FIG. 13A–13C. The explanation of FIGS. 13A–13C will be reexamined, with the supposition that Repair_Trap is invoked.

With reference to block 182 of FIG. 8, again the background object under consideration is Object X. Since Object Z overlaps Object X, it may need to be trapped against Object X. The clipping path is set at block 184 and Repair_Trap is called at block 186. Since Object Z has not been trapped before (block 200, FIG. 9), control returns to block 188 of FIG. 8. Assuming, as above, that Object Z is to be trapped, the trap color and placement are determined at block 190 and the trap 232 drawn, as shown in FIG. 13B. Once the trap 232 is drawn in block 192, a test is made at block 194 to determine if any objects remain in the shape directory that have not been considered. Object Y has yet to be considered, and the routine loops to block 180 where Object Y is retrieved. Object Y is now the "background object" being compared to the current object, Object Z.

With reference to block 182, since Object Z overlaps Object Y, it may need to be trapped against Object Y. The clipping path is set at block 184. FIG. 14A and B indicate this step by showing Objects X and Z as dashed lines, e.g., these areas are not considered by the RIP in the reaming steps. Repair_Trap is again called at block 184. With reference to FIG. 9, the current object, Object Z, has been previously trapped (trap 232), and the routine continues to block 202. At block 202, the edges at which Objects Z and Y overlap are stroked using the fill color of Object Y. This is indicated in FIG. 14A, with the dashed area 238. As can be seen, this step has the positive effect of removing the trap 232 from the effected area of Object Y, designated by reference numeral 238a. However, the step has the negative effect of overwriting a portion, area 238b, of Object Z. Thus, at block 204, Object Z is filled with its own fill color, shown by area 240. As will be appreciated, filling Object Z with its own color will erase any portion of the trap 232 that might remain in area 240, i.e., that may have extended beyond the area 238b. Having completed block 204, the routine returns to block 188 of FIG. 8.

At block 188, a test is made to determine if Object Z should be trapped against Object Y. Assuming, as above, that Object Z is to be trapped against Object Y, the trap color and placement are determined at block 190 and the trap 232 is drawn at block 192. The trap 234 is again created, as shown in FIG. 14C. It is noted that as a result of the Repair_Trap procedure, the trap 232 no longer includes the right hand corner of Object Z, which is also shown in FIG. 14C. After drawing the trap 234 at block 192, a test is made at block 194 to determine if there are any shapes in the shape directory that have not been considered. At this point, there are no other objects in the shape directory to be considered, and the process is complete. Thus, control returns to the routine of FIG. 7, which has also been completed.

As will be appreciated, the resultant traps in FIG. 14C are superior to the solution shown in FIG. 13C because the effects of earlier traps have been removed. It will also be appreciated that other methods may be used to achieve this same result, and the invention is not to be limited to the particular routine set forth in FIG. 9.

As will be appreciated from the foregoing, a trapping program in accordance with the teaching of the invention allows trapping capabilities to be provided to originating programs without the need to change the code in the originating programs. The trapping program thus runs on top of and completely transparent to the originating program.

While the preferred embodiment of the invention has been illustrated and described, it will be appreciated that various changes can be made therein without departing from the spirit and scope of the invention. For example, the instructions to the RIP to trap PDL files may be sent to the RIP independently, or be resident at the RIP, separate from any particular PDL file.

The embodiments of the invention in which an exclusive property or privilege is claimed are defined as follows:

1. A method in a raster image processor to trap page objects, comprising:
   receiving a page prolog, comprising page description language (PDL) instructions executable by a raster image processor (RIP) to trap page objects;
   receiving a page script, comprising PDL instructions describing a plurality of page objects and executable by the RIP; and
   executing the prolog PDL instructions to trap an object described by the script PDL instructions.

2. The method of claim 1, further comprising executing the prolog PDL instructions to trap each object described by the script PDL instructions.

3. The method of claim 1, further comprising:
   executing script PDL instructions by the RIP to draw a current object; and
   executing prolog PDL instructions by the RIP to:
   store the current object to an object directory;
   retrieve an object from the object directory as a background object; and
   evaluate trapping criteria to determine whether to trap the current object against the background object, and if the current object is to be trapped against the background object, determine a color and position for a trap and draw the trap.

4. A computer program stored on a computer-readable medium, comprising instructions for causing a raster image processor to trap page objects, comprising:
   a page prolog, comprising page description language (PDL) instructions executable by a raster image processor (RIP),
   wherein a RIP receives the page prolog and a page script, the page script comprising PDL instructions describing a plurality of page objects and executable by the RIP, and executes the prolog PDL instructions to trap an object described by the script PDL instructions.

5. The computer program of claim 4, wherein the prolog PDL instructions further cause the RIP to:
   execute script PDL instructions to draw a current object; and
   execute prolog PDL instructions to:
   store the current object to an object directory;
   retrieve an object from the object directory as a background object; and
   evaluate trapping criteria to determine whether to trap the current object against the background object, and if the current object is to be trapped against the background object, determine a color and position for a trap and draw the trap.

6. A computer program stored on a computer-readable medium, comprising instructions for causing a computer to:
   send a page prolog to a raster image processor (RIP); and
   send a page script to the RIP, the page script comprising page description language (PDL) instructions describing a plurality of page objects, wherein the page prolog comprises page description language (PDL) instructions for causing the RIP to trap a page object described by the script PDL instructions.

7. The computer program of claim 6, wherein the prolog PDL instructions further cause the RIP to:
   execute script PDL instructions to draw a current object; and
   execute prolog PDL instructions to:
   store the current object to an object directory;
   retrieve an object from the object directory as a background object; and
   evaluate trapping criteria to determine whether to trap the current object against the background object, and if the current object is to be trapped against the background object, determine a color and position for a trap and draw the trap.

* * * * *